United States Patent [19]

Swank

[11] Patent Number: 4,641,274

[45] Date of Patent: Feb. 3, 1987

[54] METHOD FOR COMMUNICATING CHANGES MADE TO TEXT FORM A TEXT PROCESSOR TO A REMOTE HOST

[75] Inventor: Edgar W. Swank, San Jose, Calif.

[73] Assignee: International Business Machines Corporation, Armonk, N.Y.

[21] Appl. No.: 766,722

[22] Filed: Aug. 19, 1985

Related U.S. Application Data

[63] Continuation of Ser. No. 446,732, Dec. 3, 1982, abandoned.

[51] Int. Cl.⁴ ............................................. G06F 15/00
[52] U.S. Cl. .................................................. 364/900
[58] Field of Search ... 364/200 MS File, 900 MS File; 340/711, 721

[56] References Cited

U.S. PATENT DOCUMENTS

| | | | |
|---|---|---|---|
| 3,654,609 | 4/1972 | Bleuthman et al. | 364/200 |
| 3,872,460 | 3/1975 | Fredrickson | 340/711 |
| 4,084,231 | 4/1978 | Capozzi et al. | 364/200 |
| 4,096,567 | 1/1978 | Millard et al. | 364/200 |
| 4,204,206 | 5/1980 | Bakula et al. | 340/721 |
| 4,212,077 | 7/1980 | Vittoreli | 364/900 |
| 4,215,402 | 6/1980 | Mitchell et al. | 364/200 |
| 4,290,105 | 9/1981 | Cichelli et al. | 364/200 |

Primary Examiner—James D. Thomas
Assistant Examiner—Thomas C. Lee
Attorney, Agent, or Firm—Shelley M. Beckstrand; R. Bruce Brodie; Henry E. Otto, Jr.

[57] ABSTRACT

A method of editing at a processor text formed by lines of characters received by the processor from a remote source whereby communication between the processor and the remote source is minimized. The method steps at the text processor include (a) generating a respective checking number corresponding to each line of characters received from the source; (b) modifying the received text to form a body of lines by selective addition, modification, or deletion of lines and characters; (c) generating a checking number for each line of modified text in the manner of step (a); and (d) associatively comparing the checking numbers of consecutive counterpart lines of the modified text with those of the received text and transmitting back to the remote source the entire text of only those lines which have been modified as denoted by said lines having checking numbers mismatching those of the received text.

6 Claims, 9 Drawing Figures

METHOD FOR COMMUNICATING CHANGES MADE TO TEXT FORM A TEXT PROCESSOR TO A REMOTE HOST

This application is a continuation of application Ser. No. 446,732 filed on Dec. 3, 1982, now abandoned, in the name of Edgar W. Swank, entitled Method And Means For Updating Files And Communicating Updated Files Between A Host Processor And An Intelligent Computer.

TECHNICAL FIELD

This invention relates to a method of editing text formed by lines of characters received by a processor from a remote source. More particularly, it relates to a method for minimizing communication between a processor and a remote source from which a text is obtained for editing at the processor.

BACKGROUND

In the prior art, it has been recognized that the bandwidth of serial channels is substantially less than that of information sources and sinks. It has further been recognized that communicating only the changes to files or text strings of characters would require far less bandwidth than returning an amended text over the same communication links.

A file, which is no more than a formatted character string when in storage, appears as a two-dimensional series of lines of characters. Such a multiple line body may have lines or characters added, deleted, or modified.

It should be recalled that characters are internally represented within both a text processor and a source as coded numbers. It is only for output indication, such as display or printing, that the alphabetic representation itself must be made. Typically, coded number standards such as ASCII and EBCDIC have long been used in the art.

It is also observed that if one sums the coded numbers for each line respectively, the likelihood of any two sums being the same is very small. However, a checking number formed from the mere summation or multiplication of its coded number constituents is commutative. That is, the same checking number will arise even though the permutative order varies. Thus, "the rde ball bounces" has the same value as "the red ball bounces". By recursively combining and ringshifting the coded numbers in a line n a predetermined order (say left to right), a different order of characters will yield a different checking number.

Bakula et al, U.S. Pat. No. 4,204,206, "Video Display System", issued May 20, 1980, describes a host and remote text processor where the text in different areas of the display screen at the text processor may be scrolled and edited independently. Data from the display is transmitted one line at a time during the scrolling to the host.

THE INVENTION

It is accordingly an object of this invention to devise a method of editing text formed by lines of characters received by a processor from a remote source whereby communication between the remote source and the processor is minimized, the processor being of the type capable of receiving, modifying, and transmitting text.

The foregoing object is satisfied by the method steps at the text processor of (a) generating a respective checking number corresponding to each line of characters received from the source; (b) modifying the received text to form a body of lines by selective addition, modification, or deletion of lines and characters; (c) generating a checking number for each line of modified text in the manner of step (a); and (d) associatively comparing the checking numbers of consecutive counterpart lines of the modified text with those of the received text and transmitting back to the remote source the entire text of only those lines which have been modified as denoted by said lines having checking numbers mismatching those of the received text.

Yet another observation is that changes either in terms of additions, deletions, or modifications to lines or characters are reflected in changes to the checking numbers as evidenced by a comparison match of the checking numbers of the lines of the modified text with those of the text as received from the remote source. Where consecutive lines of text match, then a mere coded indication of that fact can be remitted to the source. Several problems arise, however. Some lines may be deleted and other new lines inserted. While a linear comparison of checking numbers between the received and modified text will isolate the first point of difference, an associative compare is required to identify other runs of consecutive lines whose checking numbers comparison match the received text.

The step of associatively comparing includes (d1) comparing the checking numbers of consecutive counterpart lines of the modified and received texts and continuing said comparison linearly until the first mismatch is detected on say the ith line, where i lies in the integer range $(0 \leq i \leq m,n)$; and (d2) comparing the jth consecutive line checking number of the modified text to the $(j-1)$ consecutive line checking numbers of the received text, and, comparing the jth consecutive line checking number of the received text with the j consecutive line checking numbers of the modified text. These steps, (d1) and (d2), are repeated until the lines of the received and modified text become exhausted. Lastly, coded indications of each run of two or more consecutive lines in the modified text whose checking numbers match the checking numbers in the received text are returned from the text processor to the host. Otherwise, the text lines are themselves transmitted back to the host.

As used in this specification, the terms "checking number" and "hash number or total" are used as synonyms.

DESCRIPTION OF THE PREFERRED EMBODIMENT

Figure 1:
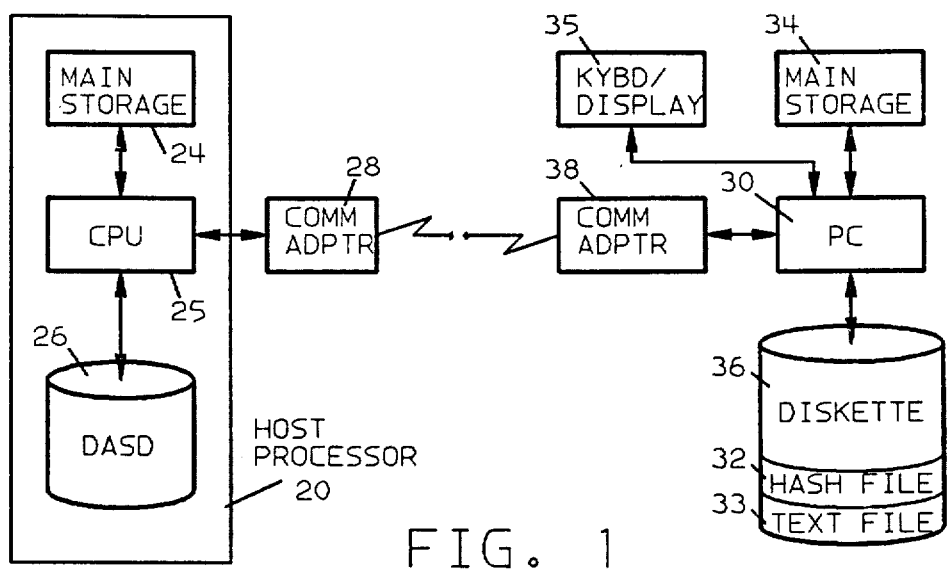
FIG. 1 is a block diagram illustrating a host processor in communication with an intelligent computer terminal.

Referring to FIG. 1, a host central processing unit or processor 20 is in communication with an intelligent terminal, such as the IBM Personal Computer 30 with keyboard/display 35, main storage 34 and diskette storage device 36. Host processor 20 includes main storage 24 and a non-volatile storage device, such as direct access storage device (DASD) 26 in which a base text file 40 (FIG. 2) may be stored. A communication link, including communication adapter 28 at the host and communication adapter 38 at the terminal, interconnects processor 20 and computer 30.

Figure 2:
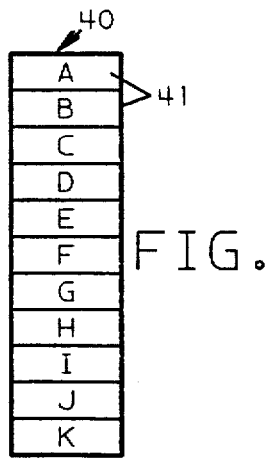
FIG. 2 is a diagram illustrating a typical file.
Figure 8:
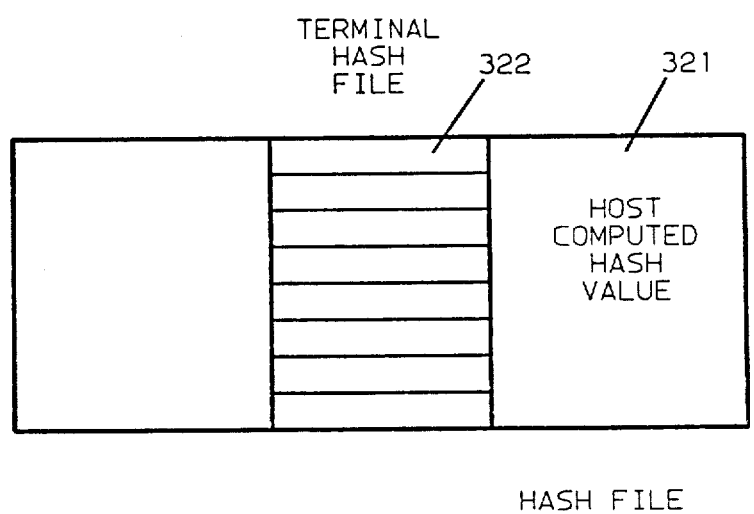
FIG. 8 is a diagram of the hash file (32) stored in the diskette (36) of the terminal.

Referring also to FIG. 2 and FIG. 8, in distributed data systems, data transfer between a terminal 30 and a host 20 is often limited by slow teleprocessing links 28, 38, and the capacity of storage devices 34 and 36 at terminal 30 is generally significantly smaller than the capacity of storage devices 24, 26 at host 20. This invention significantly improves such communications by transmitting only changed lines in an updated file from terminal 30 to host 20. As will be further described hereafter, when editing a text file, the entire file, together with a hash value calculated with respect to the entire file, is communicated from host 20 to terminal 30, there to be stored on diskette 36 at 33. A non-editable hash file is then created at the terminal containing a host-computed hash value 321 for the entire file and a terminal-generated hash value for each line of the file 322; this file is stored at terminal 30 on diskette 36 at 32. After the terminal user at keyboard/display 35, or some other application program, has edited the original text file 33, hash values are calculated for each line of the edited file, and compared line by line with hash file 32 to identify the lines which have changed (new or modified). Only changed lines are returned to host 20, along with control information specifying the location in the original file, stored on DASD 26 and brought into main storage 24 for updating, of lines to be deleted or retained. To ensure integrity of this process, the original file at host 20 is only updated after the hash value for the original entire file has been recomputed by host 20 and it matches the entire file hash total previously stored at terminal 30, thus ensuring that the original file at host 20 has not been changed since the terminal hash file 32 was generated. After the file at host 20 is updated, the terminal hash file 321 is rewritten to reflect the update. The hash values for each line are generated at terminal 30 from the updated editable terminal text file 33; and the hash value for the new entire file is recomputed by host 20 and sent to terminal 30 and stored at 321.

The procedures of the invention are implemented in application programs executed at host 20 and terminal 30. The host 20 application programs are designated as host transmit (HXMT) and host receive (HRCV) and described hereinafter by procedure specifications, with IBM System/370 assembly code provided for the file check sum (or hash) procedure. The terminal 30 application program, referred to as the emulator, is similarly described by procedure specifications, with a pseudo-code description of the associative compare procedure set forth in Tables 6-8 and Intel 8088 assembly code provided for the line check sum procedures in Tables 3-5 and for stack operations in Tables 10-19, as will be described more fully hereafter.

Referring now to FIG. 2, a typical file 40 at host 20 includes a plurallity of variable or fixed or undefined length records 41, each record 41 representing one line in file 40. As shown, the data in each record 40 is designated by a letter A, ..., K. A copy of this file is communicated to terminal 30 and stored on diskette 36 in text file 33 for editing.

Figure 3:
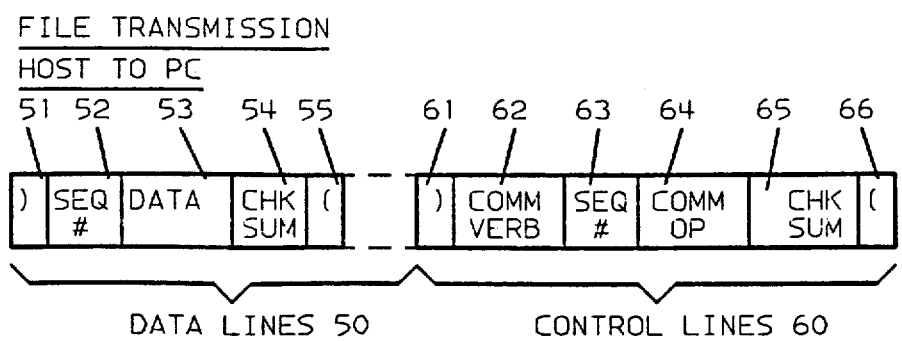
FIG. 3 is a diagram illustrating the format for communication of a file from the host processor to the intelligent terminal.
Figure 6:
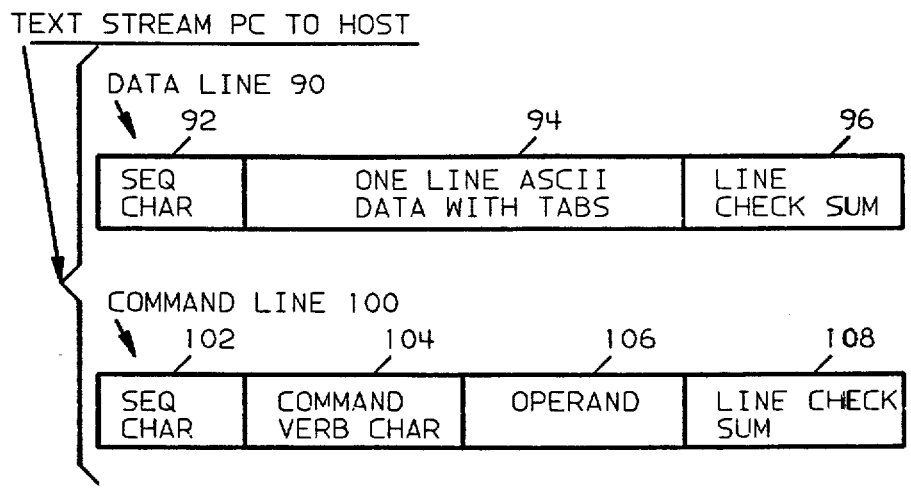
FIG. 6 is a diagram illustrating the format for communication of an updated file from the intelligent terminal to the host processor.

Referring now to FIGS. 3 and 6, the method for transfer of data to be edited from host system 20 to PC diskette 36, and return of edited data to host 20 from PC 30, will be described. In accordance with the preferred embodiment herein described, the PC 30 part of this action is invoked, such as by a user at keyboard 35, by issuing an emulator command. Emulator commands are commands which are executed by the application program (or emulator) in PC 30.

By way of illustration, the following description is provided of the user/emulator interface. An emulator command is entered by keying "%%" at keyboard/display 35. The emulator responds by displaying =], thus alerting the user that he is now commanding the emulator rather than host 28 and confirming that the "%%" was recognized. After =] appears, the user keys in a two-character command verb. If the verb is recognized, the emulator responds with a space. The user then enters a command operand and return. No part of the emulator command is sent to host 20. The emulator commands are set forth in Table 1, together with a summary description.

TABLE 1

| SUMMARY OF EMULATOR COMMANDS | |
|---|---|
| %%=]RF dev:fname.ext | Receive File |
| %%=]TF dev:fname.ext | Transmit Complete File |
| %%=]RC dev:fname.ext | Receive File for Transmit Changes |
| %%=]TC dev:fname.ext | Transmit File Changes |
| %%=]RB dev:fname.ext | Receive Binary File |
| %%=]TB dev:fname.ext | Transmit Binary File |

All of the emulator commands of Table 1 are used in file transfer and will be described hereafter. In the embodiment being described, the command operand "dev:fname.ext" names a text file 33 on diskette 36 according to IBM Personal Computer Disk Operating System (PC DOS) file naming conventions.

In the embodiment being described, editable files at host 20 are stored on DASD 26 or in main storage 24 in fixed, variable, or undefined-length records of eight-bit EBCDIC characters. On diskette 36 at PC 30, file data 32 is stored in strings of ASCII characters separated into records by ASCII carriage return and line feed (CRLF) characters. Thus, only data which can be translated uniquely into ASCII characters can be sent or received from host 20. Host 20 may, in this preferred embodiment, comprise an IBM System/370 in which most source modules do not contain TAB characters, but fields within statements are aligned into columns by padding with blanks. The host 20 file transmit application HXMT of this embodiment of the invention has the ability to substitute TABs for strings of blanks. Conversely, the data receive application HRCV at host 20 can substitute blanks for tabs. Some host files, e.g., SCRIPT source, may contain tab characters. In these cases, it is possible to prevent any translation of blanks and tabs in both directions of data transfer. Many host files contain eight-digit sequence numbers at the front of variable length records or at the end of fixed length records. The data transmit application (HXMT) eliminates these on request from the terminal. Conversely, the data receive application (HRCV) can renumber records received at host 20 from terminal 30. The protocol for processing tabs, line sequence numbers, and other similar parameters, will be described hereafter.

The purpose in not sending blanks and sequence numbers is to shorten the time to transmit a file and to occupy less diskette 36 and main storage 34 space at PC 30 during stand-alone editing. A typical stand-alone editor allows variable tab positions and treats sequence numbers, if present, the same as other data. It does not, for example, generate new sequence numbers for inserted lines.

Figure 4:
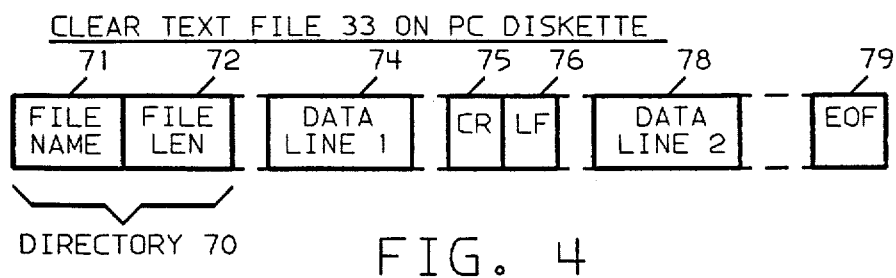
FIG. 4 is a diagram illustrating the format of a clear text file on a diskette at the terminal.
Figure 5:
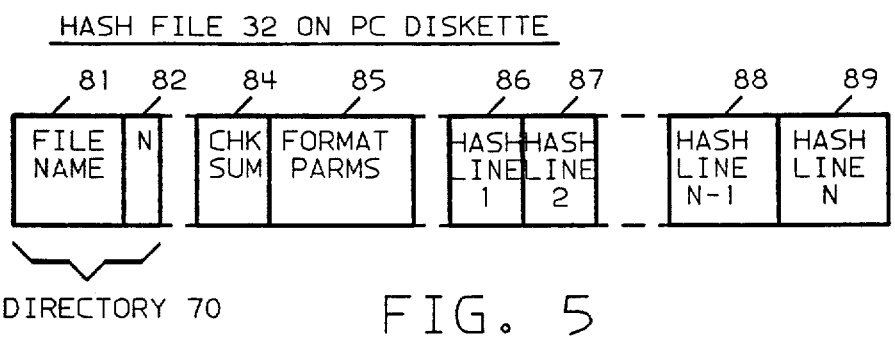
FIG. 5 is a diagram illustrating the format of a hash file on a diskette at the terminal.
Figure 9:
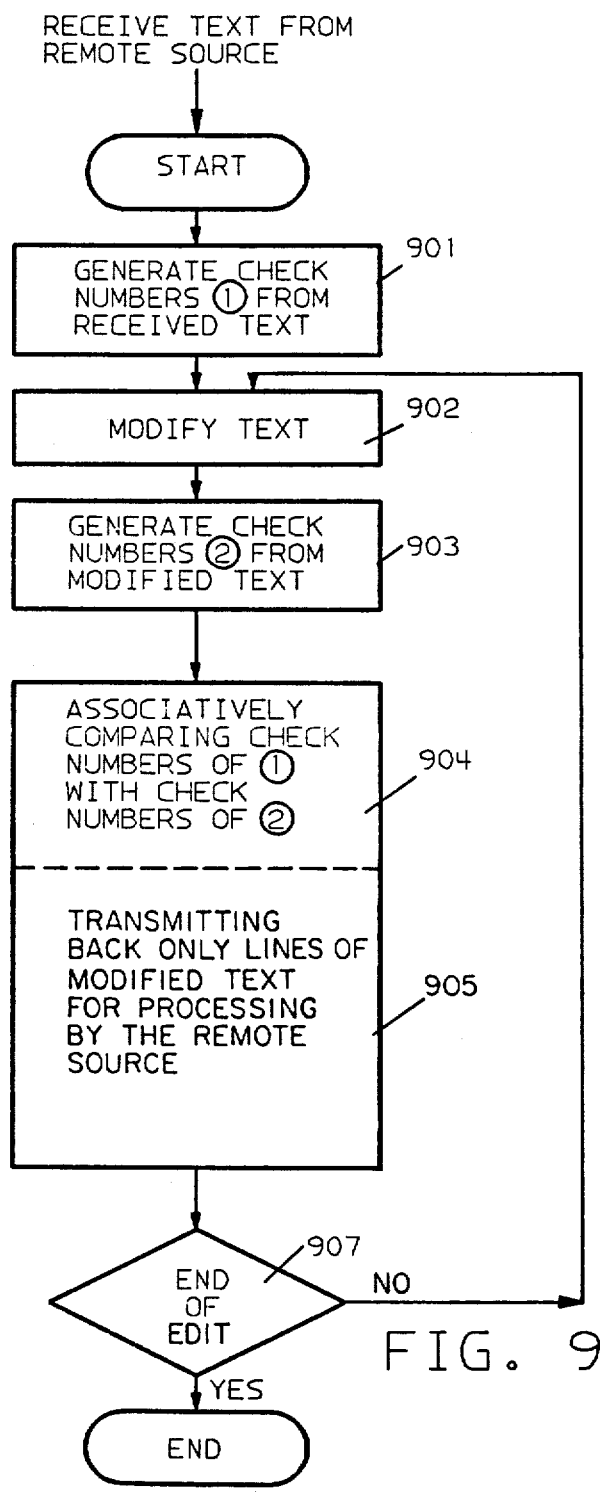
FIG. 9 is a generalized description in flow-chart fashion of the basic method of my invention.

In accordance with the invention, in order to update from PC 30 a file residing at host 20, the complete file is first transmitted from host 20 according to the format set forth in FIG. 3. The file transmitted from the host is stored at PC 30, as an editable ASCII file 33 on diskette 36 in the format set forth in FIG. 4. Terminal 30 prepares therefrom an uneditable hash file 32 (step 901 of FIG. 9) containing a hash total for each line in editable file 33 and stores it on diskette 36 in the format set forth in FIG. 5. ASCII file 33 may then be modified with a stand-alone screen editor or some other means (step 902 of FIG. 9). The host file may then be updated by sending from the terminal a data stream of changed lines 90 and control information 100 according to the format of FIG. 6 (step 905 of FIG. 9), rather than the entire updated file 33. The data stream from the terminal is generated by comparing e 33 with the file 32 of line hash totals, (step 904 of FIG. 9) as will be described hereafter in connection with Tables 6-19. After the host file 24, 26 has been updated, the file of line hash totals 32 is regenerated to match the updated ASCII file 33, which now matches the host base file 24, 26. These various file and communication message formats will be more specifically described hereafter.

The compare done in PC 30 is an associative compare which does not use sequence numbering of either the base or updated file 33. The data stream sent to the host to update the base file is based on line counts, rather than sequence numbers. To ensure the integrity of the host file and of its update process, a file checksum 84 is computed at host 20, sent to PC 30, and stored with the line hash totals. Whenever a user requests to update the base file at host 20, the file checksum for the original base file is recomputed by host 20 and compared to the total previously sent to the terminal. Only if the two checksums match is the update allowed to proceed at the host. This procedure also prevents an inadvertent update at host 20 of the wrong file caused by a mismatch of host and terminal file names.

Referring now to FIG. 3 in connection with FIG. 1, a description will be given of the procedure for transmitting a file to the terminal from host 20 for update. In this embodiment of the invention, the following steps may be followed by the user at PC (or terminal) 30 to initiate and control this process:

1. Establish a normal terminal session with host 20 (which may be operating, for example, under control of an IMB MVS/TSO or VM/CMS operating systems), and enter a CLIST/EXEC:

| XMITH dsname | (TSO), or |
| --- | --- |

-continued

| XMITH file type | (CMS) |
| --- | --- |

Where "dsname" is a host data set for MVS, and "file type" is an existing file on the default CMS mini-disk. This invokes the host transmit application HXMT.

2. Determining on how the CLIST/EXEC is set up, formatting commands for assumed tab positions and other formatting parameters may be read from the terminal or from another file. In update mode, for the embodiment being described, these parameters are stored on the terminal diskette 36 for use when the host file is updated.

3. When the host 20 program HXMT signals the user at keyboard/display 35 that it is ready to send, the user enters the emulator command:

%%=9RC dev:fname.ext where "dev:fname.ext" is the name of a terminal 30 file 33 to be created or replaced on a diskette 36. The RC command will also cause the emulator to create or replace a file "dev:fname.HSH" 32 which contains the file 33 contents in a compressed hash form, as will be explained hereafter in connection with Tables 3-5.

4. When the emulator command is accepted, the host application HXMT sends the data from the host file 24, 26, line by line, to terminal 30 according to the format of FIG. 3. After the terminal 30 has received each line and completed any necessary disk I/O, it sends an acknowledgement to host 20. When the host receives the acknowledgement, it sends the next line of data, and so on.

Thus, in host 20 to terminal 30 file transfers, the terminal initiates the transfer by sending a command word, such as "%A", to host 20. Each data line 50 from host 20 in response thereto includes a recognition character ")" 51, a sequence letter 52, a line of data 53, a check sum 54, and a trailer character "(" 55. Herein, sequence letter 52 is an even modulo ten data sequence letter selected for each data line in sequence from the set A,C,E,G,I,A,C, . . . . Check sum 54 is a modulo ten checksum digit generated by the host transmit application HXMT by adding the EBCDIC characters in a line modulo 256 and taking the result modulo ten, translating it to an EBCDIC digit. The terminal verifies the checksum 54 by translating each incoming ASCII character back to EBCDIC and performing the same calculations. Following transmission of data lines 50, two command lines 60 are transmitted from the host: an end-of-file command and a file checksum/formatting command. A control line 60 includes recognition character ")" 61, command verb 62, sequence number 63 (an even modulo ten data sequence number selected in sequence from the set 2,4,6,8,0,2,4, . . . ), command operand 64, checksum 65, and trailer "(" 66. In the file checksum/formatting command word 60, the command operands, or parameters, are the same as for the "F" command described hereafter. These parameters 64 are written (overlayed) at the beginning of the "fname.HSH" terminal diskette 36 file 32 into an area (84, 85) reserved for them before the line hash totals (86 . . . 89). Thus, referring to FIG. 5, a hash file 32 is identified in diskette 36 directory 70 by file name 81 and length 82, the hash file 32 itself including file check sum 84, format parameters 85, and a hash value 86 . . . 89 for each of n lines in file 33. And, referring to FIG. 4, the clear text file 33 on diskette 36 is identified in directory 70 by file name 71 and file length 72, and includes a plurality of ASCII data lines 74, 78, ... separated by line delimiter fields 75 and 76, with an end-of-file (EOF) field 79 at the end.

To update a host file 24, 26 from a terminal 30 file 33, the user/terminal performs the following procedure:

1. The user establishes a normal terminal session with host 20 (MVS/TSO or VM/CMS) and enters a CLIST-/EXEC:

| RDH dsname | (TSO), or |
| RDH file type | (CMS) | where "dsname" or "file type" is an existing file previously transferred to terminal 30 with the RC command. The RDH command invokes the host 20 file receive application HRCV.

2. During update all format commands to HRCV are overriden by parameters used when the file was originally transmitted from the host.

3. When HRCV indicates that it is ready to receive, the user enters at keyboard/display 35 the emulator command:

%%=JTC dev:fname.ext where "dev:fname.ext" is the name of a terminal file 33 on a diskette 36 which has been updated with a stand-alone editor or other means. The same diskette 36 must also contain a "dev:fname.HSH" file 32 which reflects the unchanged host file (dsname or file type) to be updated.

4. After the emulator command is accepted and if the files "dev:fname.ext" and "dev:fname.HSH" are found, transmission to the host begins.

5. First the file checksum, tabs and options are sent to host 20 in a command line 100. The file checksum must match that generated for the current base file on the host or the TC command is abended by HRCV.

6. The terminal will send the change data from the terminal file 33, line by line 90, to the host application. The host 20 application HRCV sends an acknowledgement when it is ready to accept another line 90. When all changes have been sent to the host 20 and accepted by HRCV, the "dev:fname.HSH" file 32 is rewritten to match the current file, including a new file checksum computed at the host 20 and sent by HRCV. The session then returns to interactive terminal mode.

Referring to FIG. 6, each data line 90 from terminal 30 is prefixed by a one-character header 92. The header base is an even modulo ten record sequence number (0,2,4,6,8,0, ...), which the host application (HRCV) checks to ensure no missing records. If a data line 90 is preceded by a form feed on the terminal file 33, a one is added to header sequence number 92. This will cause a page skip to be recorded on file 24, 26 if it contains printer control characters.

Terminal to host control, or command, lines 100 are distinguished by a header field 102 comprising a sequence letter (A,C,E, ..., I) in place of the digit used for the data line record sequence number 92. The letter used corresponds to the digit which would have been used for a data line sequence number, so the sequence checking is maintained for control lines interspersed with data lines. Control line 100 includes, also, command verb character 104 (described hereinafter), operand 106, and line check sum 108 fields. The trailer, or line check sum field 96 or 108, is a modulo ten checksum digit. Herein, this is generated by translating each character to EBCDIC, adding it modulo 256, and taking the result modulo ten, translating it to an ASCII digit. HRCV does the inverse at host 20, for verification, except that data comes in already translated to EBCDIC by the host access method.

HRCV at host 20 acknowledges receipt of each line by sending a two-character string "%n" where "n" is the record sequence number 92 or character 102 (less one if the number of character was odd) of the last record 90, 100 successfully received with a good checksum 96, 108. Terminal 30 resends any record 90, 100 if it receives an acknowledgement other than expected.

The various command verbs 104, together with their associated operands 106, will next be described.

(1) F file checksum/formatting parameters

This is the first line 100 sent by terminal 30 to host 20 in update mode. It tells host 20 application HRCV that an update mode transmission is in process, and requests HRCV to compute a file checksum for the base file in storage 24, 26 and to verify that the file checksum sent in operand field 106 matches it. Field 106 includes: (1) the file checksum; (2) the tab settings; (3) a no-sequence-numbers or renumber-with-sequence-numbers (NONUM/RENUM) switch having a value "Y" if NONUM was specified when the file was originally sent from the host, and "N" otherwise (on file update, "Y" forces RENUM mode); and (4) a NXTAB switch, which is "Y" if NXTAB was specified when the file was sent from the host, "N" otherwise.

Figure 7:
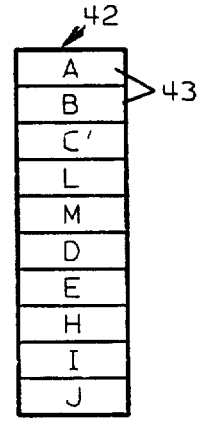
FIG. 7 is a diagram illustrating a typical updated file.

When HRCV receives this command "F" at the beginning of transmission, it first makes a copy of the host base file 40 (FIG. 2) from DASD 26 in a DATASAV file in DASD 26. This will be the base against which updates are applied back to the original host file to create at host 20 its copy of modified file 42 (FIG. 7). At the same time it computes the file checksum. If the file checksums match, an acknowledgment of the "F" command is sent to the terminal 30 and file transfer proceeds. If the file checksums do not match, HRCV sends an abend command and terminates; the terminal issues an error message at display 35 and returns to interactive mode.

The "F" command is used again at the end of transmission in conjunction with the "S" command, described hereafter.

(2) Cnnnnn

The Cnnnnn command causes HRCV to copy "nnnnn" records from the original host copy of base file 40 into the host copy of new file 42 being prepared at the host. These represent lines in base file 40 which are unchanged in the updated file 42.

(3) Dnnnnn

The Dnnnnn command causes HRCV to skip "nnnnn" records in the original base file 40 copy at the host. These represent lines which are deleted in the updated file 42.

(4) Data line

Any data lines received at the host are written to the output file 42 in storage 24, 26. These represent either insertions to or replacements of lines in base file 40.

(5) S

The S command is sent after all data and update control lines have been sent from PC 30 to host 20. It requests HRCV to compute a new file checksum which it returns to terminal 30 in a specially formatted acknowledgment:

%nnnnnnnnnns
where "nnnnnnnnnn" is the new file checksum and "s" is the line sequence number of the "S" command. Since this format does not contain a checksum digit, the new file checksum is verified by sending a second "F" command to host 20. If the checksums do not match, HRCV acknowledges with the previous line sequence and the terminal resends the "S" command.

(6) E

The E command is the end-of-transmission command from terminal 30 to host 20. Host 20 application HRCV responds by closing its files and terminating. The terminal session to interactive mode.

Referring to FIG. 7 in connection with FIG. 2, the manner in which the above commands are used will be explained. As shown in FIG. 7, a terminal text file 40 has been modified to form a new terminal text file 42 which includes lines having text A, B, C, D, E, H, I, and J from original file 40, has a modified line C', and inserted lines L and M. Lines F, G, and K have been deleted from file 40 during the preparation therefrom of modified file 42. By this invention, the modified, inserted, and deleted lines are identified (by a procedure to be described hereafter) and the sequence of commands set forth in Table 20 sent to the host for updating the host copy of the text file.

In the following description of Tables 2-19, the numbers in parentheses generally refer to source code line numbers which perform the steps being described.

Two hash totals are used in the file update procedure of the invention. These are set forth in Tables 2-5. The line hash total of Table 3-5, set forth in 8088 assembly language notation, is computed and stored at the PC 30 terminal for each ASCII line received from the host for update mode. By the procedure of Table 2, a line hash total for the entire file is computed at host 20. This is sent to terminal 30, and stored in field 84 of hash file 32. Each hash total algorithm has the following common elements:

(1) The hash total starts at zero (157; 253).

(2) Before each input character is added, the previous total is ring shifted left three bits, with bits shifted off the high-order end of the total reentered on the low-order end (186–188; 278–386). Thus, all bits of the hash total participate more evenly in the total, and simple transposition of characters or lines will produce a different total.

(3) The seven or eight-bit input character is added to the low-order end of the shifted previous total. If there is a carry (overflow), a one is added (190–194; 387–389).

(4) The above process is repeated until end-of-line or end-of-file (167–168; 396–397).

The hash totals have the following unique attributes:

(1) The terminal line hash total is a 32-bit (4 byte) value computed from the 7-bit ASCII charcters in a line including the terminating LF character (154–170).

(2) The host file hash total is a 31-bit value (the sign bit is not included) computed from all the eight-bit EBCDIC characters, left-to-right, of all lines, front-to-back, of the host base file. All characters of each host line record participate, including (a) record descriptors for variable records, (b) trailing blanks in fixed records, and (c) sequence numbers (390).

TABLE 2

| | | HOST FILE CHECKSUM PROCEDURE | |
|---|---|---|---|
| 250 | ; | | |
| 251 | ; | SYSTEM/370 CODE TO READ FILE AND | |
| 252 | ; | COMPUTE FILE CHECKSUM | |
| 253 | | XC | FILEHSH,FILEHSH SET CHECKSUM TO ZERO |
| 254 | SNDLOOP1 | GET | DATAIN,DATAINB GENERATE LINES 255-258 |
| 255 | +SNDLOOP1 | LA | 1,DATAIN LOAD PARAMETER REG 1 |
| 256 | + | LA | 0,DATAINB LOAD PARAMETER REG 0 |
| 257 | + | L | 15,48(0,1) LOAD GET ROUTINE ADDR |
| 258 | + | BALR | 14,15 LINK TO GET ROUTINE |
| 259 | | IC | R3,SEQNO LAST SEQNO SENT |
| 260 | | N | R3,=X'0000000E' |
| 261 | | A | R3,=F'2' |
| 262 | | C | R3,=F'10' |
| 263 | | BL | *+6 |
| 264 | | SR | R3,R3 |
| 265 | | O | R3,=X'000000F0' |
| 266 | | STC | R3,SEQNO NEXT SEQNO TO SEND |
| 267 | | STC | R3,TERMOUTB+9 |
| 268 | | CLI | CHGSW,0 CHANGES MODE? |
| 269 | | BE | FCKS100 NO |
| 270 | | LA | R1,DATAINB INPUT POINTER |
| 271 | | LH | R3,DCBLRECL LENGTH OF INPUT BUFF |
| 272 | | LTR | R3,R3 LENGTH OF DATA TO SCAN |
| 273 | | BNP | FCKS100 EXIT IF ZERO |
| 274 | | LA | R0,1 |
| 275 | | L | R15,FILEHSH |
| 276 | | SR | R10,R10 |
| 277 | FCKS050 | IC | R10,0(R1) INPUT CHAR |
| 278 | | SLA | R15,1 RING SHIFT LEFT 31 BITS 3 TIMES |
| 379 | | BNO | *+8 |
| 380 | | A | R15,=F'1' |
| 381 | | SLA | R15,1 |
| 382 | | BNO | *+8 |
| 383 | | A | R15,=F'1' |
| 384 | | SLA | R15,1 |
| 385 | | BNO | *+8 |
| 386 | | A | R15,=F'1' |
| 387 | | AR | R15,R10 ADD IN CHAR |
| 388 | | BNO | *+12 |
| 389 | | A | R15,=F'1' |

TABLE 2-continued
HOST FILE CHECKSUM PROCEDURE

| 390 |         | N   | R15,=X'7FFFFFFF' |                          |
|-----|---------|-----|------------------|--------------------------|
| 391 |         | AR  | R1,R0            |                          |
| 392 |         | BCT | R3,FCKS050       |                          |
| 393 |         | ST  | R15,FILEHSH      |                          |
| 394 | FCKS100 | EQU | *                |                          |
| 395 |         | LA  | R2,DATAINB       | SAVE INPUT BUFFER ADDR   |
| . . . |       |     |                  |                          |
| 396 |         | B   | SNDLOOP1         | TO GET NEXT LINE FROM FILE |
| . . . |       |     |                  |                          |
| 397 | INEOF   | EQU | *                | DATA IN END-OF-FILE EXIT |

TABLE 3
TERMINAL LINE HASH PROCEDURES

```
150  ;
151  ;   HASH LINE FROM D1 TO EOL INTO 4-BYTE FIELD
152  ;   POINTED AT BY RCPTR
153  ;
154  HSHLIN  LABEL NEAR
155          PUSH    DI
156          MOV     DI,RCPTR
157          CALL    CLR4B       ;TABLE 4
                                 ;CLEAR 4 BYTES POINTED TO BY DI
158          POP     DI
159  HSHL10: MOV     AL,[DI]     ;MOVE NEXT CHAR OF INPUT TO AL
160          PUSH    AX
161          PUSH    DI
162          MOV     DI,RCPTR
163          CALL    CKS4B       ;TABLE 4
164          POP     DI
165          POP     AX
166          INC     DI
167          CMP     AL,LF       ;END OF LINE (LF = X'0A')
168          JNZ     HSHL10
169          RET
170          PAGE
```

TABLE 4
CHECKSUM PROCEDURES

```
180  ;
181  ;   ADD ACCUMULATOR AL TO 4-BYTE FIELD AT (DI)
182  ;   AS A CHECKSUM.
183  ;
184  CKS4B   LABEL NEAR
185          PUSH    AX          ;AX=AL+AH
186          CALL    RNGSLT      ;TABLE 5
                                 ;RING SHIFT LEFT
                                 ;BY ONE BIT THE 4 BYTE FIELD
                                 ;POINTED TO BY DI
187          CALL    RNGSLT
188          CALL    RNGSLT
189          POP     AX
190          CALL    ADD4B       ;TABLE 5
                                 ;ADD TO 4-BYTE RESULT
191          JC      $+3         ;SAME AS JUMP BELOW
192          RET                 ;RETURN IF NO FINAL CARRY
193          MOV     AL,1
194          JMP     ADD4B       ;ADD BACK ANY CARRY
                                 ;SAME AS CALL FOLLOWED BY RETURN
195  ;
196  ;   CLEAR 4-BYTE FIELD AT (DI)
197  ;
198  CLR4B   LABEL NEAR
199          XOR     AX,AX
200          MOV     [DI],AX
201          MOV     [DI+2],AX
202          RET
```

TABLE 5

ROUTINES FOR ASSOCIATIVE COMPARE

```
210 ;
210 ;       ROUTINES FOR ASSOCIATIVE
211 ;       COMPARE WITH CHECKSUMS
212 ;
213 ;       RING SHIFT LEFT 4-BYTE
            FIELD AT (DI)
214 ;
215 RNGSLT  LABEL NEAR
216         PUSH       AX
217         MOV        AX,[DI]
218         RCL        AX,1
219         RCL        WORD PTR[DI+2],1
220         RCL        WORD PTR[DI],1
221         POP        AX
222         RET
223 ;
224 ;       ADD AL TO 4-BYTE FIELD AT (DI)
225 ;
226 ADD4B   LABEL NEAR
227         PUSH       DI
228         PUSH       CX
229         MOV        CX,3
230         ADD        DI,CX
231         ADD        [DI],AL
232         JNC        ADD4BX
233 ADD4B2: DEC        DI
234         INC        BYTE PTR[DI]
235         JNZ        ADD4BX
236         LOOP       ADD4B2
237         STC
238 ADD4BX: POP        CX
239         POP        DI
240         RET
```

In Tables 6-19 is set forth the associative compare procedure executed in terminal 30 by the emulator of the invention. This compare procedure use a stack (6,13) in main storage 34 for each of the two input files 32, 33. In this implementation, each stack contains 1535 4-byte (32-bit) elements. The contents of the elements are the 32-bit line checksums (line hash totals) derived in Tables 3-5. These are read directly from the hash total base file 32 and are computed as each line is read from the updated ASCII text file 33 (in FIG. 1; 42 in FIG. 7). For the updated file 33, 42, there is another 1535-element array (B' auxiliary stack of lines 13; 119) which contains sector and relative byte addresses for the start of each line in the corresponding line checksum stack (13). When lines to be inserted or replaced are found, this parameter (which is a combination of sector and relative byte address) is used to retrieve (119) the line from the diskette file 33 to be sent to the host 20.

The associative compare procedure starts by reading (5, 13) one line from each of two input files. If the two lines have equal line checksums, they match, and synchronous mode (4) is entered. If the two lines do not match (19-20), then search mode is entered (41).

In synchronous mode, all lines read from one input file since entry to synchronous mode have matched (19,20) corresponding lines from the other input file. The input stacks contain only the most recently read lines from each file (6A,9). Synchronous mode is terminated by encountering (a) two input lines which do not compare (20) or (b) end-of-file on either input file (11,17). A count is kept of the lines compared since synchronous mode was entered (21). When synchronous mode terminates, this count is used to generate the Cnnnnn control command sent to host 20 (42).

Search mode is entered when two lines are encountered in synchronous mode which do not compare (41). In search mode, a line is read (44,69) from each file which is compared against all lines in the stack for the other file (47,72). Each stack contains the lines read from its file since search mode was entered (44,69). This process continues until the last line read from one file matches (51,75-76) some line in the stack of the previous file. The status of each stack is saved (52,77), then each file is logically read (53-57,78-82) from the compare point to determine how many consecutive lines match.

If only one consecutive line matches (101), the compare is ignored. This will result in one data line being sent to the host instead of a C00001 control command. This action also effectively increases the line hash totals to 64 bits.

If two to 15 consecutive lines match, the position of each line in its respective stack and the compare count is placed (61,101) into a five-entry compare-fail stack, and search mode continues (64,65).

If 16 consecutive lines compare equal, the compare-fail stack is searched (66,106) for the entry with the smallest compare count which does not interfere with (that is, occurs in the stack before and does not overlap) any of a nest of entries with a larger compare count, all of which do not interfere with the 16 line entry. Interference is thus defined by the assembly code at lines 459-472 of Table 11. If an entry is found, the end of each stack is set to the positions of the entry (66,106). If no entry is found, the end of each stack is set to the start of the 16-line compare.

If the base file stack is not empty (116), a delete (Dnnnnn) control command is generated and sent to the host (117). "nnnnn" is the count of entries in the base file stack. The ASCII lines corresponding to the entries in the updated file stack are retrieved from the diskette and sent to the host (118,119). The stacks are cleared by moving the front-of-stack pointers to the end of the stacks (119A). Search mode is now terminated and synchronous mode resumed (122). Since the end-of-stack pointer for at least one of the stacks has been moved up (119A), a logical read for a record only updates the end-of-stack pointer until the last record actually read from the diskette is encountered (5, 13, . . . , 80, . . .).

In this embodiment, the compare-fail stack is a five-entry stack which is maintained in order sorted (61,101) by decreasing compare count. Should more than five 2-15 line compares be encountered before a 16-line compare, the smallest entries are lost (62,102). This results in the lines for these smallest entries being sent to the host even though they really didn't have to be. As would be apparent to those skilled in the art, the procedure of the tables could be modified to accommodate more entries in a larger stack.

If the 1535-entry stacks become full during search mode, a "compare table overflow & flush" occurs (109-111). The same procedure is followed as if a 16-line compare occurred at the overflow point. If this occurs, file integrity is maintained, but synchronous mode may not be reestablished. One-line compares are ignored and 2-15 line compares are stacked (61-62, 101-102) to avoid losing synchronization when a line is inserted which happens to match a line already in the file. This can occur frequently in programming languages: for example, in comments and commonly used inline routines.

TABLE 6
ASSOCIATIVE COMPARE MAIN LOOP

| | |
|---|---|
| 001 | ASCOMP: |
| 002 | PROCEDURE ASSOCIATIVE COMPARE |
| 003 | (MAIN COMPARE LOOP-SYNCHRONOUS MODE 'A' FILE IS HASH FILE 32 'B' FILE IS TEXT FILE 33) |
| 004 | CLOOP: |
| 005 | LOGICAL READ A 'RECORD' (HASH TOTAL) FROM 'A' FILE |
| 006 | ADD HASH TOTAL TO 'A' STACK |
| 006A | SET 'A' STACK TO CONTAIN ONLY LAST RECORD READ |
| 007 | IF END_OF_FILE THEN DO |
| 008 | . LOGICAL READ A RECORD FROM 'B' FILE |
| 009 | . SET 'B' STACK TO CONTAIN ONLY LAST RECORD READ |
| 010 | . MARK 'A' FILE EMPTY |
| 011 | . GOTO NC1 |
| 012 | END |
| 013 | LOGICAL READ A RECORD FROM 'B' FILE. CONVERT RECORD TO HASH TOTAL AND ADD TO 'B' STACK. SAVE DISKETTE LOCATION IN 'B' AUXILIARY STACK. |
| 014 | SET 'B' STACK TO CONTAIN ONLY LAST RECORD READ (ALL PREVIOUS RECORDS HAVE COMPARED AND COMPARE COUNT WILL BE INCREMENTED. COMPARE COUNT IS C VERB OPERAND) |
| 015 | IF END_OF_FILE THEN DO |
| 016 | . MARK 'B' FILE EMPTY |
| 017 | . GOTO NC1 |
| 018 | END |
| 019 | COMPARE (HASH TOTALS) LAST RECORDS FROM 'A' AND 'B' FILES |
| 020 | IF NOT EQUAL GOTO NC1 |
| 021 | COMPARE_COUNT = COMPARE_COUNT + 1 |
| 022 | IS THIS FIRST COMPARE AFTER NON-COMPARE? |
| 023 | IF YES THEN DO |
| 024 | . RESET FIRST COMPARE SWITCH |
| 025 | . RESET COMPARE_COUNT TO 1 |
| 026 | END |
| 027 | GOTO CLOOP |

TABLE 7
ASSOCIATIVE COMPARE SEARCH MODE I

| | |
|---|---|
| 040 | (FIRST NON-COMPARE AFTER COMPARE - ENTER SEARCH MODE) |
| 041 | NC1: |
| 042 | IF THIS IS FIRST NON-COMPARE AFTER SYNCH MODE THEN SENT Cnnnnn (COMPARE_COUNT) TO HOST |
| 043 | CLOOP2: |
| 044 | LOGICAL READ A RECORD FROM 'A' FILE AND ADD TO 'A' STACK |
| 045 | IF END_OF_FILE THEN GOTO NOCAB |
| 046 | IF 'B' STACK EMPTY GOTO ENDCYC1 |
| 047 | COMPARE LAST 'A' RECORD AGAINST ALL RECORDS IN 'B' STACK |
| 048 | SCBX1: |
| 049 | CONTINUE COMPARING 'A' RECORD AGAINST REMAINING 'B' RECORDS |
| 050 | STOP AT FIRST 1-LINE MATCH |
| 051 | IF NO MATCH FOUND THEN GOTO NOCAB |
| 052 | SAVE 'A' AND 'B' STACK AND LOGICAL FILE POINTERS ANCSHLD, BNCSHLD, PCFCNTA & PCFCNTB IN 'HOLD' |
| 053 | RESET 'B' STACK AND LOGICAL FILE POINTERS TO END AT COMPARE POINT |
| 054 | DO FOR M = 1 TO 16 |
| 055 | LOGICAL READ A NEXT RECORD FROM BOTH 'A' AND 'B' FILES |
| 056 | IF RECORDS ARE UNEQUAL THEN GOTO CLP210 |
| 057 | END |
| 058 | GOTO CLP216 |
| 060 | CLP210: |
| 061 | SAVE POINTERS FOR FAILED COMPARE ON COMPARE_FAIL_STACK (TABLE 10) SORTED BY |

TABLE 7-continued
ASSOCIATIVE COMPARE SEARCH MODE I

| | |
|---|---|
| | SIZE (LINES 495-547) |
| 062 | IF COMPARE_FAIL_STACK FULL THEN DISCARD SHORTEST ENTRIES |

TABLE 8
ASSOCIATIVE COMPARE SEARCH MODE II

| | |
|---|---|
| 063 | CLP216: |
| 064 | RESET 'A' AND 'B' STACK AND LOGICAL FILE POINTERS FROM 'HOLD' |
| 065 | IF 16-LINE COMPARE FAILED THEN GOTO SCBX1 |
| 066 | RESET STACKS AND LOGICAL FILES TO SMALLEST ENTRY FROM COMPARE_FAIL_STACK WHICH DOES NOT INTERFERE WITH LONGER COMPARES IN STACK (SEE TABLE 11 LINES 450-494) |
| 067 | GOTO GENXO |
| 068 | NOCAB: |
| 069 | LOGICAL READ A RECORD FROM 'B' FILE AND ADD TO 'B' STACK |
| 070 | IF END_OF_FILE THEN GOTO ENDCYC1 |
| 071 | IF 'A' STACK EMPTY THEN GOTO ENDCYC1 |
| 072 | COMPARE LAST 'B' RECORD AGAINST ALL RECORDS IN 'A' STACK |
| 073 | SCBX2 |
| 074 | CONTINUE COMPARING 'B' RECORD AGAINST REMAINING 'A' RECORDS |
| 075 | STOP AT FIRST 1-LINE MATCH |
| 076 | IF NO MATCH FOUND THEN GOTO ENDCYC1 |
| 077 | SAVE 'A' AND 'B} STACK POINTERS IN 'HOLD' |
| 078 | RESET 'A' STACK AND LOGICAL FILE POINTERS TO END AT COMPARE POINT |
| 079 | DO FOR M = 1 TO 16 |
| 080 | . LOGICAL READ A RECORD FROM 'A' AND 'B' FILES |
| 081 | . IF RECORDS ARE UNEQUAL THEN GOTO CLP310 |
| 082 | END |
| 083 | GOTO CLP316 |

TABLE 9
ASSOCIATIVE COMPARE SUBROUTINES

| | |
|---|---|
| 100 | CLP310: |
| 101 | IF COMPARE GREATER THAN 1, SAVE POINTERS FOR FAILED COMPARE ON COMPARE_FAIL_STACK SORTED BY SIZE, ELSE GOTO SCBX2 |
| 102 | IF STACK FUL THEN DISCARD SHORTEST ENTRIES (SEE TABLES 12&13, LINES 495-547) |
| 103 | CLP316: |
| 104 | RESET 'A' AND 'B' STACK POINTERS FROM 'HOLD' |
| 105 | IF 16-LINE COMPARE FAILED THEN GOTO SCBX2 |
| 106 | RESET STACKS AND LOGICAL FILES TO SMALLEST ENTRY FROM FAILED COMPARE STACK WHICH DOES NOT INTERFERE WITH 16-LINE COMPARE (TABLE 11 LINES 450-494) |
| 107 | GOTO GENXO |
| 108 | ENDCYC1: |
| 109 | IF EITHER 'A' OR 'B' STACK IS FULL (1535 LINES) THEN DO |
| 110 | . WRITE COMPARE FLUSH MESSAGE AND SET SW |
| 111 | . GOTO GENXO (TO FLUSH BUFFERS EVEN THOUGH THERE WAS NO COMPARE) |
| 112 | END |
| 113 | IF END_OF_FILE ON BOTH 'A' AND 'B' FILES THEN GOTO CLSSET |
| 114 | ELSE GOTO CLOOP2 |
| 115 | GENXO: |
| 116 | IF 'A' STACK NOT EMPTY THEN |
| 117 | SEND Dnnnnn FOR nnnnn RECORDS ON 'A' STACK |
| 118 | IF 'B' STACK NOT EMPTY THEN |
| 119 | RETRIEVE RECORDS ON 'B' STACK FROM DISKETTE USING STORED DISK LOCATION PARAMETERS AND SEND THEM TO HOST (IF SW=SET, THIS IS FLUSHING) |
| 119A | SET STACKS TO START OF 16 LINE COMPARE |
| 120 | IF END_OF_FILE ON BOTH 'A' AND 'B' FILES |

TABLE 9-continued
ASSOCIATIVE COMPARE SUBROUTINES

| | |
|---|---|
| | THEN GOTO CLSSET |
| 121 | IF BUFFERS WERE FLUSHED GOTO CLOOP2 |
| 122 | ELSE GOTO CLOOP |
| 123 | (END OF FILE ON BOTH 'A' AND 'B') |
| 124 | CLSSET: |
| 125 | IF 'A' AND 'B' WERE IN SYNCH AT CLOSE THEN |
| 126 | SEND Cnnnnn (COMPARE_COUNT) TO HOST |
| | (IN SYNCH: BOTH 'A' AND 'B' ARE EMPTY (EOF)) |
| 127 | ELSE DO |
| 128 | . IF 'A' STACK NOT EMPTY THEN |
| 129 | . SEND Dnnnnn FOR nnnnn RECORDS ON 'A' STACK |
| 130 | . IF 'B' STACK NOT EMPTY THEN |
| 131 | . SEND RECORDS ON 'B' STACK TO HOST |
| | (IN DATA LINES, FIG. 8) |
| 132 | END |
| 133 | END PROCEDURE ASCOMP |

TABLE 10
COMPARE FAIL STACK

| | | | |
|---|---|---|---|
| 400 | ; | | |
| 401 | ; NON-COMPARE (COMPARE-FAIL) STACK OFFSETS | | |
| 402 | ; | | |
| 411 | NCSMAP | EQU 0 | |
| 412 | NCSCCNT | EQU 0 | ;2 CNT OF RECS (el M) WHICH COMPARED |
| 413 | NCSFP | EQU 2 | ;2 FORWARD PTR |
| 414 | NCSBP | EQU 4 | ;2 BACKWARD PTR |
| 415 | NCSACNT | EQU 6 | ;2 CNT OF RECS PTR1-LAST NC REC A |
| 416 | NCSBCNT | EQU 8 | ;2 CNT OF RECS PTR1-LAST NC REC B |
| 417 | NCSAPTR | EQU 10 | ;2 APTR2 AT START OF THIS COMPARE |
| 418 | NCSBPTR | EQU 12 | ;2 BPTRW AT START OF THIS COMPRE |
| 419 | LNCSENT | EQU 16 | ;LENGTH OF NCS ENTRY |
| 420 | LNCSAD | DW | G:NCS08 |
| 421 | NCSR1 | DW | 0 |
| 422 | NCSR2 | DW | 0 |
| 423 | ; | | |
| 424 | ; NON-COMPARE (COMPARE-FAIL) STACK | | |
| 425 | ; | | |
| 426 | NCSPTR | DW | 0,G:NCS01,G:NCS08 ;POINTER TO STACK |
| 427 | NCS01 | DW | 0,G:NCS02,0000000,0,0,0,0,0 |
| 428 | NCS02 | DW | 0,G:NCS03,G:NCS01,0,0,0,0,0 |
| 429 | NCS03 | DW | 0,G:NCS04,G:NCS02,0,0,0,0,0 |
| 430 | NCS04 | DW | 0,G:NCS05,G:NCS03,0,0,0,0,0 |
| 431 | NCS05 | DW | 0,G:NCS06,G:NCS04,0,0,0,0,0 |
| 432 | NCS06 | DW | 0,G:NCS07,G:NCS05,0,0,0,0,0 |
| 433 | NCS07 | DW | 0,G:NCS08,G:NCS06,0,0,0,0,0 |
| 434 | NCS08 | DW | 0,0000000,G:NCS07,0,0,0,0,0 |

TABLE 11
PROCESS COMPARE FAIL STACK 1

| | | | |
|---|---|---|---|
| 450 | ; | | |
| 451 | ; PROCESS STACK ENTRIES AFTER M COMPARE SUCCESS | | |
| 452 | ; | | |
| 454 | PCFSTK | LABEL NEAR | |
| 455 | PCFLP10: CALL | NCSRMF | ;REMOVE 1ST(LARGEST) ENTRY |
| 456 | MOV | AL,[DI] | ;NCSCCNT=# RECORDS COMPARING |
| 457 | CMP | AL,2 | ;AT LEAST 2? |
| 458 | JC | PCFF20 | ;NO. FREE & EXIT |
| | | | ;JUMP & CARRY. HAS SAME 8088 |
| | | | ;OP CODE AS JNB/JAE (X'72') |
| 459 | PUSH | DI | |
| 460 | MOV | SI,[DI+NCSACNT] | ;DOES THIS COMPARE INTERFERE? |
| | | | ;# RECORDS IN A STACK AT |
| | | | ;POINT WHERE SOME PREVIOUS |
| | | | ;COMPARE LESS THAN 16 OCCURRED |
| 461 | MOV | DI,PCFCNTA | ;# ENTRIES IN A STACK WHEN 16 |
| | | | ;LINE COMPARE OCCURRED |
| 462 | CMP | DI,SI | |
| 463 | POP | DI | |
| 464 | JC | PCFF10 | ;YES, IT DOES INTERFERE |
| 465 | PUSH | DI | |
| 466 | MOV | SI,[DI+NCSBCNT] | |
| 467 | MOV | DI,PCFCNTB | |
| 468 | CMP | DI,SI | |
| 469 | POP | DI | |
| 470 | JC | PCFF10 | ;YES, IT DOES INTERFERE |
| 471 | PUSH | DI | |
| 472 | ADD | DI,NCSACNT | ;NO. IT DOESN'T INTERFERE, SO |
| | | | ;REPLACE CURRENT ENTRY |
| 473 | MOV | SI,DI | ;LOCATION OF STACK ENTRY |
| 474 | CLD | | |
| 475 | MOV | DI,OFFSET G:PCFCNTA | ; MOVES TWO BYTES |
| 476 | MOVSW | | ; |
| 477 | MOV | DI,OFFSET G:PCFCNTB | ; POINTED TO BY |
| 478 | MOVSW | | ; |

TABLE 11-continued
PROCESS COMPARE FAIL STACK I

| | | | |
|---|---|---|---|
| 479 | MOV | DI,OFFSET G:ANCSHLD | ; SI INTO AREA |
| 480 | MOVSW | | |
| 481 | MOV | DI,OFFSET G:BNCSHLD | ; POINTED AT BY DI |
| 482 | MOVSW | | ; PCFCNTA AND PCFCNTB CONTAIN COUNTS<br>; OF NUMBER OF RECORDS IN THE A AND<br>; B STACKS AT TIME THIS COMPARE<br>; STARTS. THE A STACK IS THE<br>; UNMODIFIED FILE CHECK SUM STACK<br>; AND THE B STACK STACKS MODIFIED<br>; FILE CHECK SUMS AND AN AUXILIARY<br>; STACK OF RECORD NUMBER POINTERS<br>; TO FULL FILE RECORDS |
| 483 | POP | DI | |
| 484 PCFF10: | CALL | NCSFRE | |
| 485 | CALL | NCSAD | |
| 486 | JMP | PCFLP10 | |
| 487 PCFF20 | LABEL NEAR | | |
| 488 | CALL | NCSFRE | |
| 489 | CALL | NCSAD | |
| 490 | MOV | DI,ANCSHLD | |
| 491 | CALL | RSAHL | |
| 492 | MOV | DI,BNCSHLD | |
| 493 | CALL | RSBHL | |
| 494 | RET | | |

TABLE 12
PROCESS COMPARE FAIL STACK II

| | | | |
|---|---|---|---|
| 495 | ; | | |
| 496 | ; STORE STACK ENTRY FOR M COMPARE FAIL | | |
| 497 | ; | | |
| 499 CFSTACK | LABEL NEAR | | ; CALLED WHEN ONE LINE COMPARES<br>; BUT SCAN AHEAD FINDS LESS THAN<br>; 16 LINES COMPARE |
| 500 | MOVE | CNSCMP,255 | ;SET CONSEC COMP SW |
| 501 | MOVE | AX,M+1 | |
| 502 | SUB | AX,CX | ;COUNT OF COMPARING RECORDS<br>;CX IS RESIDUAL COUNT,<br>;COUNTING DOWN FROM 16 |
| 503 | MOV | CX,AX | |
| 504 | CMP | AL,2 | |
| 505 | JNC | $+3 | |
| | | | ; LINES 506-547 CREATE A STACK ENTRY.<br>; STACK IS SORTED BY NUMBER OF LINES<br>; THAT DID COMPARE BY CALLING NCSAD |
| 506 | RET | | ;DONT STACK. LESS THAN TWO<br>;COMPARING |
| 507 | MOV | DI,LNCSAD | ;LAST STACK ENTRY |
| 508 | MOV | AL,[DI] | ;COMPARE SPAN |
| 509 | SUB | AX,CX | |
| 510 | JC | CFS100 | ;ADD IF NEW COUNT NOT LESS |
| 511 | JZ | CFS100 | |
| 512 | NEG | AX | |
| 513 | INC | AX | |
| 514 | MOV | BX,[DI+NCSACNT] | |
| 515 | MOV | DI,PCFCNTA | |
| 516 | SUB | DI,BX | |
| 517 | CMP | DI,AX | |
| 518 | JNZ | CFS100 | |
| 519 | MOV | DI,LNCSAD | ;LAST STACK ENTRY |
| 520 | MOV | SI,[DI+NCSACNT] | |
| 519 | MOV | DI,PCFCNTA | |
| 520 | XCHG | DI,SI | |
| 521 | SUB | DI,SI | |
| 522 | CMP | DI,AX | |
| 523 | JNZ | $+3 | |
| 524 | RET | | |

TABLE 13
PROCESS COMPARE FAIL STACK III (TABLE 12 CONTINUED)

| | | | |
|---|---|---|---|
| 525 CFS100 | LABEL NEAR | | |
| 526 | CALL | NCSRML | ;REMOVE LST REC FROM STACK |
| 527 | MOV | AX,CX | |
| 528 | CMP | AL,[DI] | |
| 529 | JC | CFS800 | ;ADD IF NEW COUNT GREATER |
| 530 | JZ | CFS800 | |

TABLE 13-continued

PROCESS COMPARE FAIL STACK III (TABLE 12 CONTINUED)

| 531 |  | PUSH | DI |  |
|---|---|---|---|---|
| 532 |  | MOV | [DI],CL |  |
| 533 |  | ADD | DI,NCSACNT |  |
| 534 |  | CLD |  |  |
| 535 |  | MOV | SI,OFSET G:PCFCNTA |  |
| 536 |  | MOVSW |  |  |
| 537 |  | MOV | SI,OFFSET G:PCFCNTB |  |
| 538 |  | MOVSW |  |  |
| 539 |  | MOV | SI,OFFSET G:ANCSHLD |  |
| 540 |  | MOVSW |  |  |
| 541 |  | MOV | SI,OFFSET G:BNCSHLD |  |
| 542 |  | MOVSW |  |  |
| 543 |  | POP | DI |  |
| 544 |  | MOV | LNCSAD,DI |  |
| 545 | CFS800 | LABEL NEAR |  |  |
| 546 |  | CALL | NCSAD | ;ADD TO STACK IN ORDER |
| 547 | CFS900: | RET |  |  |

TABLE 14

PROCESS COMPARE FAIL STACK IV

| 549 | ; |  |  |  |
|---|---|---|---|---|
| 550 | ; | ADD STACK ENTRY POINTED TO BY DI TO ACTIVE STACK |  |  |
| 551 | ; | ACTIVE STACK ENTRIES ARE SORTED BY DECREASING |  |  |
| 552 | ; | COMPARE COUNT NCSCCNT |  |  |
| 553 | ; |  |  |  |
| 554 | NCSAD | LABEL NEAR |  |  |
| 555 |  | MOV | NCSR1,DI |  |
| 556 | NCSAD01: | MOV | DI,OFFSET G:NCSPTR |  |
| 557 | NCSADLP | LABEL NEAR |  |  |
| 558 |  | MOV | NCSR2,DI |  |
| 559 |  | MOV | SI,[DI+NCSBP] |  |
| 560 |  | OR | SI,SI | ;SETS CONDITION REGISTERS ;TO ZERO |
| 561 |  | JZ | NCSAD10 | ;STARTR OF STACK, ADD AT START |
| 562 |  | MOV | DI,NCSR1 |  |
| 563 |  | MOV | AL,[SI] | ;OLD REC NCSCCNT |
| 564 |  | CMP | AL,[DI] | ;NEW REC |
| 565 |  | JNC | NCSAD10 | ;NEW REC LO OR EQUAL. ;ADD HERE |
| 566 |  | MOV | DI,SI | ;CURRENT ENTRY = NEXT |
| 567 |  | JMP | NCSADLP | ;CONTINUE LOOP |
| 568 | NCSAD10 | LABEL NEAR |  |  |
| 569 |  | CALL | NCSTF | ;TEST FREE |
| 570 |  | JZ | NCSAD20 | ;YES. ADD TO STACK |
| 571 |  | CALL | NCSCKN | ;CHECK FOR NESTED ENTRY |
| 572 |  | JNZ | NCSAD20 | ;NO. ADD TO STACK |
| 573 |  | CALL | NCSFRE | ;YES. FREE ENTRY AT DI |
| 574 |  | JMP | NCSAD01 | ;AND RET TO STACK |

TABLE 15

PROCESS COMPARE FAIL STACK V

| 575 | NCSAD20 | LABEL NEAR |  |  |
|---|---|---|---|---|
| 576 |  | PUSH | SI | ;NCSR4 |
| 577 |  | MOV | DI,NCSR1 |  |
| 578 |  | INC | DI | ;NCSFP |
| 579 |  | INC | DI |  |
| 580 |  | MOV | SI,OFFSET G:NCSR2 |  |
| 581 |  | CLD |  |  |
| 582 |  | MOVSW |  |  |
| 583 |  | POP | SI | ;NCSR4 |
| 584 |  | MOV | [DI],SI | ;NCSBP(R1)=R4 |
| 585 |  | PUSH | SI | ;NCSR4 |
| 586 |  | MOV | DI,NCSR2 |  |
| 587 |  | INC | DI | ;NCSBP(R2) |
| 588 |  | INC | DI |  |
| 589 |  | INC | DI |  |
| 590 |  | INC | DI |  |
| 591 |  | MOV | SI,OFFSET G:NCSR1 | ;NCSBP(R2)=R1 |
| 592 |  | MOVSW |  |  |
| 593 |  | POP | SI | ;NCSR4 |
| 594 |  | OR | SI,SI | ;NEW ENT AT ;ST OF STACK |
| 595 |  | JNZ | $+5 | ;NO |
| 596 |  | MOV | SI,OFFSET G:NCSPTR | ;Y. SET NXT PTR ;TO OHEAD |
| 597 |  | INC | SI | ;NCSFP(R4) |

TABLE 15-continued
PROCESS COMPARE FAIL STACK V

| 598 | INC | SI | |
|---|---|---|---|
| 599 | MOV | DI,SI | |
| 600 | MOV | SI,OFFSET G:NCSR1 | ;UPD FWD PTR ;OF NEXT ENT/HEADER |
| 601 | MOVSW | | |
| 602 | RET | | |

TABLE 16
LIST MAINTENANCE ROUTINES I

| 610 | ; | | | |
|---|---|---|---|---|
| 611 | ; | REMOVE FIRST ENTRY FROM STACK | | |
| 612 | ; | RETURN ENTRY IN DI | | |
| 613 | ; | | | |
| 614 | NCSRMF | LABEL NEAR | | |
| 615 | | MOV | DI,NCSPTR+NCSFP | ;FIRST ENTRY |
| 616 | | MOV | SI,[DI+NCSFP] | ;SI IS NEW 1ST ENTRY |
| 617 | | XCHG | SI,DI | ;SI IS ADDRESS OF ;REMOVED ENTRY |
| 618 | | MOV | NCSPTR+NCSFP,DI | ;UPDATE HEAD OF STACK ;POINTER |
| 619 | | OR | DI,DI | ;TEST FOR ZERO: IS ;STACK EMPTY |
| 620 | | JNZ | $+5 | ;SKIP NEXT INSTRUCTION ;IF STACK NOT EMPTY |
| 621 | | MOV | DI,OFFSET G:NCSPTR | ;STACK IS EMPTY, POINT ;TO HEAD OF STACK |
| 622 | | INC | DI | ;NBPTR |
| 623 | | INC | DI | |
| 624 | | INC | DI | |
| 625 | | INC | DI | ;DI IS ADDRESS OF BACK ;POINTER (NCSBP) |
| 626 | | CALL | SZER2 | ;ZERO THE BACK POINTER |
| 627 | | XCHG | SI,DI | ;DI=RMVD ENTRY ADDR |
| 628 | | PUSH | DI | ;SAVE ADDRESS OF REMOVED ;ENTRY |
| 629 | | INC | DI | |
| 630 | | INC | DI | ;DI IS ADDRESS OF ;FORWARD/BACKWARD PTRS |
| 631 | | CALL | SZER4 | ;ZERO THE POINTERS IN ;REMOVED ENTRY |
| 632 | | POP | DI | ;RESTORE ADDRESS OF ;REMOVED ENTRY |
| 633 | | RET | | ;RETURN TO CALLER |

TABLE 17
LIST MAINTENANCE ROUTINES II

| 634 | ; | | | |
|---|---|---|---|---|
| 635 | ; | REMOVE LAST ENTRY FROM STACK | | |
| 636 | ; | RETURN ENTRY IN DI | | |
| 637 | ; | | | |
| 638 | NCSRML | LABEL NEAR | | |
| 639 | | MOV | DI,NCSPTR+NCSBP | ;LAST ENTRY |
| 640 | | MOV | SI,[DI+NCSBP] | |
| 641 | | XCHG | DI,SI | |
| 642 | | MOV | NCSPTR+NCSBP,DI | |
| 643 | | OR | DI,DI | |
| 644 | | JNZ | $+5 | |
| 645 | | MOV | DI,OFFSET G:NCSPTR | |
| 646 | | INC | DI | ;NFPTR |
| 647 | | INC | DI | |
| 648 | | CALL | SZER2 | |
| 649 | | XCHG | SI,DI | ;DI=RMVD ENTRY ADDR |
| 650 | | PUSH | DI | |
| 651 | | INC | DI | |
| 652 | | CALL | SZER4 | |
| 653 | | POP | DI | |
| 654 | | RET | | |

TABLE 18
LIST MAINTENANCE ROUTINES III

| 655 | ; | |
|---|---|---|
| 656 | ; | FREE NON COMPARE STACK (NCS) ENTRY AT DI |
| 657 | ; | (INCLUDING SAVE AND RESTORE WORKING REGISTERS) |

TABLE 18-continued

| | | LIST MAINTENANCE ROUTINES III | |
|---|---|---|---|
| 658 | NCSFRE: | PUSH | DI |
| 659 | | PUSH | CX |
| 660 | | XOR | AL,AL |
| 661 | | MOV | CX,LNCSENT |
| 662 | | CLD | |
| 663 | | REP STOSB | ;ZERO THE ENTIRE NON COMPARE ;STACK ENTRY |
| 664 | | POP | CX |
| 665 | | POP | DI |
| 666 | | RET | |
| 667 | ; | | |
| 668 | ; CHECK FOR NESTED STACK ENTRIES | | |
| 669 | ; | | |
| 670 | NCSCKN: | PUSH | DI ;SAVE WORKING REGISTERS |
| 671 | | PUSH | SI |
| 672 | | PUSH | CX |
| 673 | | ADD | DI,NCSACNT ;COMPARE NCS A COUNT AND ;B COUNT FOR EQUALITY |
| 674 | | ADD | SI,NCSACNT |
| 675 | | MOV | CX,2 |
| 676 | | CLD | |
| 677 | | REPZ CMPSW | |
| 678 | | POP | CX ;RESTORE WORKING REGISTERS |
| 679 | | POP | SI |
| 680 | | POP | DI |
| 681 | | RET | |

TABLE 19

| | | LIST MAINTENANCE ROUTINES IV | |
|---|---|---|---|
| 690 | ; | | |
| 691 | ; TEST FOR FREE (ZERO) NCS ENTRY AT DI | | |
| 692 | ; | | |
| 693 | NCSTF: | PUSH | DI |
| 694 | | PUSH | CX |
| 695 | | XOR | AL,AL |
| 696 | | MOV | CX,LNCSENT |
| 697 | | CLD | |
| 698 | | REPZ SCASB | ;SCAN ENTIRE ENTRY FOR A ;NON-ZERO BYTE |
| 699 | | POP | CX |
| 700 | | POP | DI |
| 701 | | RET | |
| 702 | SZER4: | XOR | AX,AX |
| 703 | | CLD | |
| 704 | | STOSW | ;STORE 4 BYTES OF ZEROS AT |
| 705 | | STOSW | ;LOCATION ADDRESSED BY DI |
| 706 | | RET | |
| 707 | SZER2: | XOR | AX,AX |
| 708 | | CLD | |
| 709 | | STOSW | ;STORE 2 BYTES OF ZEROS AT ;LOCATION ADDRESSED BY DI |
| 710 | | RET | |

Format option commands are read by HXMT and HRCV from an optional CMDIN file. This may be allocated to the terminal or any file a user sets up, which could contain frequently used command configurations. All commands start with the command-name. Operands, if any, follow.

The command TABS sets the tab positions. In its absence, default positions may be used. The same tab positions are used for both direction of data transmission. When using the TC command, HRCV uses tab positions sent from the terminal which were saved in the fname.HSH file when the file was originally transferred with the RC command. The operand of this command is zero to 15 column numbers, in ascending order, separated from each other and the TABS command name. If no operands are specified, this prevents any substitution of tabs for blanks on transmission from the host. This is not the case on transmission to the host. If tabs beyond the last tab position are received by the host, one blank is substituted unless the NXTAB command is operative.

The command NONUM may be specified when sending a file from the host. For RECFM F and V files, this has the effect of removing the eight-digit sequence number from the data before it is sent. For RECEFM F, the last eight characters of each record are not sent. For RECVM V, the first eight characters are not sent. There is no effect for format U records. Use of this option speeds up file transmission, and may make the data easier to edit at the terminal. This option is not specified for files which do not have sequence numbers, since it could result in loss of data.

The command RENUM can be specified to HRCV to cause it to add new sequence numbers to a numberless RECFM F or V file being received from the terminal. When working with the TC command, RENUM is activated if and only if NONUM was active when the file was originally transferred to the terminal with an RC command. RENUM is not recommended if the file on the terminal already has sequence numbers. On RECFM F files the new numbers would overlay the old numbers; but on RECFM V files, the new numbers would be appended to the front of each line, resulting in two sets of numbers on each line.

The command NXTAB may be specified to HRCV when sending a file the host It prevents expansion of tabs to blanks. This option is used when the original host file contained the TAB character. NXTAB may also be specified to HXMT. It has not effect when used with the RF command, but sets the NXTAB switch in the fname.HSH file when used with the RC. This sets the NXTAB option when HRCV is later used to receive changes from this same file.

The file transfer process is subject to many possible errors, most of which are recovered automatically. Most unrecoverable errors are due to host failure.

When receiving a file from the host, a checksum error may occur. This means that the checksum digit for a given line did not match the data. HXMT attempts to resend the line. If the error is recoverable, transmission proceeds. Any unrecoverable error causes an indefinite loop, which is terminated by the user causing the emulator to return to interactive mode. Then, the user causes a break to be sent to the host, and the HXMT application can be cancelled. This type of error is most often caused by trying to send and EBCDIC character which cannot be translated into ASCII. It can also be caused by trying to send a line longer than the VM LINE-SIZE, which causes VM to insert CRLF characters.

If an unrecoverable error not caused by ASCII-EBCDIC translation problems or line length occurs during TF, RF, or RC, recovery may be accomplished by repeating the command at a later time. However, if a TC command is abended, it is important to recover the base file on the host, which may have been partially overwritten, especially on sequential files. Before any alteration of the base file during a TC, HRCV may make a copy of the base file in a DATASAV file on DASD 26. If the base file has been damaged, it is important to recover by copying the DATASAV file back to the base file before reuseing the DATASAV file by doing another TC.

The TC command is abended by the host if the file checksum of the current host base file does not match the file checksum computed at the last successful TC or RC for that file, indicating a base file mismatch. A base file mismatch is caused by use of the TF command or any direct updating of the host file at some time after the last successful TC or RC command for this file. For this reason, all updating of a host file being maintained through update mode must first be done by updating the terminal copy and then sending the changes to the host with the TC command. Once a file mismatch has occurred, three recovery procedures may be implemented, as follows:

(1) Use the TF command followed by RC command. This procedure will lose any updates applied directly to the host file.

(2) Use the RC command directly. This will lose any updates applied to the terminal file.

(3) Use the TF command to create a new host file, saving the current host file. Use manual methods to merge the updates from both files into a common file which is then resent to the host with RC.

TABLE 20

| EXAMPLE OF FILE UPDATE COMMAND SEQUENCE | |
|---|---|
| F | (file checksum and formatting parameters) |
| C00002 | (copy two lines: A and B) |
| D00001 | (delete one line: C) |
| C' | (modified data line: C') |
| L | (new data line: L) |
| M | (new data line: M) |
| C00002 | (copy two lines: D and E) |
| D00002 | (delete two lines: F and G) |
| C00003 | (copy three lines: H, I, and J) |
| D00001 | (delete one line: K) |
| S | (request new file checksum) |
| F | (echo new file checksum back to host) |
| E | (end of transmission) |

I claim:

1. A method of communicating changes made to text formed from lines of characters received from a remote source as electrical signals by an electronic processor to said remote source whereby said processor includes means for storing text, means for receiving, modifying and transmitting text, and a device for inputting information, each character being represented within the processor and the source as a coded number, comprising the steps of:

(a) generating by said processor and storing in said storage means a respective checking number corresponding to each one of m lines of characters received from the source;

(b) modifying by said processor the received text to form a body of n lines by selective addition, modification, or deletion of lines and characters based upon the information input through the inputting device, the text as modified being stored in said storage means;

(c) generating by said processor a checking number for each line of modified text in the manner of step (a); and (d) associatively comparing by said processor the checking numbers of consecutive counterpart lines of the modified text with those of the received text and transmitting by said processor back to the remote source the entire text of only those lines which have been modified as denoted by said lines having checking numbers mismatching those of the received text thereby to minimize communication of changes made to the text between the remote source and processor.

2. A method according to claim 1, wherein the step of associatively comparing includes the steps of:

(d1) comparing the checking numbers of consecutive counterpart lines of the modified and received texts and continuing said comparison linearly until the first mismatch is detected on the ith line, where i lies in the integer range ($o \leq i \leq m,n$);

(d2) performing reciprocal comparison by comparing the jth consecutive line checking number of the modified text with the (j−1) consecutive line checking numbers of the received text and comparing the jth consecutive line checking number of the received text with the j consecutive line checking numbers of the modified text, where j lies in the integer range ($i \leq j \leq m,n$), the reciprocal comparison continuing until a first match detected on the kth line where k lies in the integer range ($j \leq k \leq m,n$);

(d3) repeating steps (d1) and (d2) by changing j sequentially in a preselected direction until the lines of the received and modified texts become exhausted; and (d4) transmitting to the remote source indications of each run of two or more consecutive lines in the modified text whose counterpart checking numbers match the checking numbers in the received text, said indications representing counts of lines of the received text which have not been modified or lines of received text which have been deleted.

3. A method according to claim 1, wherein each step (a) and (c) of generating the checking number includes the step of recursively combining and ringshifting the coded numbers in a predetermined order.

4. A method according to claim 3, wherein the step of recursively combining is selected from a set of mathematical operations consisting of addition and/or multiplication.

5. A method according to claim 1, wherein the checking number varies as the permutative order of the characters in the same given line vary.

6. A method of communicating changes made to text formed by lines of characters received from a remote source as electrical signals by an electronic processor to said remote source whereby said processor includes means for storing text, means for receiving, modifying, and transmitting text, and a device for inputting information, each character being represented within the processor and the source as a coded number, comprising the steps of:

(a) generating by said processor and storing in said storing means a respective checking number corresponding to each one of a plurality of lines of characters received from the source, each checking number being formed from the coded numbers by recursively combining and ringshifting said numbers in a predetermined order;

(b) modifying by the processor the received text to form a body of modified lines based upon the information input through the inputting device;

(c) generating by the processor a checking number of each line of modified text; and (d) associatively comparing by said processor the checking numbers of consecutive counterpart lines of the modified text with those of the received text and transmitting by said processor back to said remote source the entire text of only those lines which have been modified as denoted by said lines having checking numbers mismatching those of the received text thereby to minimize communication of changes made to the text between the remote source and processor, said step of associatively comparing including the steps of:

(1) comparing the checking numbers of consecutive counterpart lines of the modified and received texts and continuing said comparison linearly until the first mismatch is detected;

(2) performing reciprocal comparison by comparing the next consecutive line checking number of the modified text to the preceding consecutive line checking numbers of the received text and comparing said consecutive line checking number of the received text with the next consecutive line checking numbers of the modified text, the reciprocal comparison continuing until a first match is detected;

(3) repeating steps (1) and (2) until the lines of the received and modified texts become exhausted; and (4) transmitting to said remote source (a) the entire text of those lines which have been modified as denoted by a mismatch of corresponding checking numbers, and (b) indications of each run of at least a predetermined number of consecutive lines in the modified text whose checking numbers match checking numbers in the received text, said indications representing counts of lines of the received text which have not been modified or lines of received text which have been deleted.

* * * * *